United States Patent
Scuderi et al.

(10) Patent No.: US 8,210,138 B2
(45) Date of Patent: Jul. 3, 2012

(54) SPLIT-CYCLE ENGINE WITH PILOT CROSSOVER VALVE

(75) Inventors: Stephen P. Scuderi, Westfield, MA (US); Riccardo Meldolesi, Shoreham-by-Sea (GB)

(73) Assignee: Scuderi Group, LLC, West Springfield, MA (US)

( * ) Notice: Subject to any disclaimer, the term of this patent is extended or adjusted under 35 U.S.C. 154(b) by 367 days.

(21) Appl. No.: 12/720,746

(22) Filed: Mar. 10, 2010

(65) Prior Publication Data

US 2010/0236534 A1    Sep. 23, 2010

Related U.S. Application Data

(60) Provisional application No. 61/162,383, filed on Mar. 23, 2009.

(51) Int. Cl.
*F02B 33/00* (2006.01)
*F02B 25/00* (2006.01)
(52) U.S. Cl. .................... 123/70 R; 123/68; 123/90.24
(58) Field of Classification Search .............. 123/68, 123/70 R, 90.15–90.18, 90.24–90.26, 308
See application file for complete search history.

(56) References Cited

U.S. PATENT DOCUMENTS

2009/0038599 A1*  2/2009  Tussing et al. .............. 123/70 R
* cited by examiner

*Primary Examiner* — Noah Kamen
(74) *Attorney, Agent, or Firm* — Fildes & Outland, P.C.

(57) ABSTRACT

A split-cycle engine includes a rotatable crankshaft. A compression piston is slidably received within a compression cylinder and operatively connected to the crankshaft such that the compression piston reciprocates through an intake stroke and a compression stroke during a single rotation of the crankshaft. An expansion piston is slidably received within an expansion cylinder and operatively connected to the crankshaft such that the expansion piston reciprocates through an expansion stroke and an exhaust stroke during a single rotation of the crankshaft. A crossover passage interconnects the expansion and compression cylinders. The crossover passage includes a crossover compression valve and a crossover expansion valve defining a pressure chamber therebetween. A pilot crossover valve is disposed between the crossover passage and the expansion cylinder. The pilot crossover valve equalizes fluid pressures acting against the crossover expansion valve in an opening direction, reducing the forces required in actuating the crossover expansion valve.

14 Claims, 4 Drawing Sheets

SPLIT-CYCLE ENGINE WITH PILOT CROSSOVER VALVE

CROSS REFERENCE TO RELATED APPLICATION

This application claims the benefit of U.S. Provisional Application No. 61/162,383, filed Mar. 23, 2009.

TECHNICAL FIELD

This invention relates to pilot valves for engines and particularly, though not exclusively, for use in split-cycle engines between the crossover passages and the expansion cylinders.

BACKGROUND OF THE INVENTION

The term split-cycle engine as used in the present application may not have yet received a fixed meaning commonly known to those skilled in the engine art. Accordingly, for purposes of clarity, the following definition is offered for the term "split-cycle engine" as may be applied to engines disclosed in the prior art and as referred to in the present application.

A split-cycle engine as referred to herein comprises:
a crankshaft rotatable about a crankshaft axis;
an expansion (power) piston slidably received within an expansion cylinder and operatively connected to the crankshaft such that the expansion piston reciprocates through an expansion stroke and an exhaust stroke during a single rotation of the crankshaft;
a compression piston slidably received within a compression cylinder and operatively connected to the crankshaft such that the compression piston reciprocates through an intake stroke and a compression stroke during a single rotation of the crankshaft; and
a crossover passage interconnecting the expansion and compression cylinders, the crossover passage including a crossover compression (XovrC) valve and a crossover expansion (XovrE) valve defining a pressure chamber therebetween.

Referring to the prior art, FIG. 1 shows a split-cycle engine 1 having separate compression 2 and expansion 3 (combustion) cylinders connected by a pressurized crossover passage 4. Another example is disclosed in U.S. Pat. No. 6,543,225 to Scuderi (the '225 patent), filed on Jul. 20, 2001 and assigned to the assignee of the present invention, which is herein incorporated by reference in its entirety. FIG. 1 (as well as the '225 patent) illustrates inwardly opening poppet valves for the compression cylinder inlet valve 5, the XovrE valve 6 and the exhaust valve 7. The XovrC valve 8 is illustrated as a check valve but could be of any other suitable type, including an inwardly opening poppet valve similar to the other valves that move towards the piston (into the cylinder) when opening.

SUMMARY OF THE INVENTION

The present invention provides various embodiments of pilot crossover valves that may be used in one or more locations of the split-cycle engine cylinders such as for equalizing fluid pressures acting on an outwardly opening XovrE valve, as well as for other uses. Outwardly opening valves move away from the piston and/or the cylinder when opening. In a split-cycle engine, they may assist in maximizing the compression and expansion ratios by reducing piston to head clearance volumes. In the disclosed embodiments, the pilot crossover valves provide means for reducing the forces required in actuating the XovrE valve, particularly the cracking pressure and force to be overcome upon initial opening of the valve, when the crossover passage pressures are high and the expansion cylinder pressures are low.

In accordance with the present invention, a split-cycle engine includes a crankshaft rotatable about a crankshaft axis. A compression piston is slidably received within a compression cylinder and operatively connected to the crankshaft such that the compression piston reciprocates through an intake stroke and a compression stroke during a single rotation of the crankshaft. An expansion piston is slidably received within an expansion cylinder and operatively connected to the crankshaft such that the expansion piston reciprocates through an expansion stroke and an exhaust stroke during a single rotation of the crankshaft. A crossover passage interconnects the expansion and compression cylinders. The crossover passage includes a crossover compression (XovrC) valve and a crossover expansion (XovrE) valve defining a pressure chamber therebetween. A pilot crossover valve is disposed between the crossover passage and the expansion cylinder. The pilot crossover valve equalizes fluid pressures acting against the crossover expansion (XovrE) valve in an opening direction, reducing the forces required in actuating the crossover expansion (XovrE) valve.

An auxiliary passage may communicate the crossover passage with the expansion cylinder, wherein the pilot crossover valve controls flow of fluid from the auxiliary passage into the expansion cylinder. The pilot crossover valve may be a poppet-type valve, a pintle-type valve, or a biased pintle-type valve. The pilot crossover valve may also be an outwardly opening valve that opens outwardly and away from the expansion cylinder.

A method of equalizing fluid pressure acting against a crossover valve of a split-cycle engine including a crankshaft rotatable about a crankshaft axis, a compression piston slidably received within a compression cylinder and operatively connected to the crankshaft such that the compression piston reciprocates through an intake stroke and a compression stroke during a single rotation of the crankshaft, an expansion piston slidably received within an expansion cylinder and operatively connected to the crankshaft such that the expansion piston reciprocates through an expansion stroke and an exhaust stroke during a single rotation of the crankshaft, and a crossover passage interconnecting the expansion and compression cylinders, the crossover passage including a crossover compression (XovrC) valve and a crossover expansion (XovrE) valve defining a pressure chamber therebetween, includes the steps of: disposing a pilot crossover valve between the crossover passage and the expansion cylinder; and opening the pilot crossover valve prior to opening the crossover expansion (XovrE) valve during a single rotation of the crankshaft to equalize fluid pressures acting against the crossover expansion (XovrE) valve in an opening direction, reducing the forces required in actuating the crossover expansion (XovrE) valve.

The method may include the step of forming an auxiliary passage that communicates the crossover passage with the expansion cylinder, wherein the pilot crossover valve controls flow of fluid from the auxiliary passage into the expansion cylinder. The pilot crossover valve may be a poppet-type valve, a pintle-type valve, or a biased pintle-type valve. The pilot crossover valve may also be an outwardly opening valve that opens outwardly and away from the expansion cylinder.

In the following disclosed exemplary embodiments, the split-cycle engine includes outwardly opening XovrE poppet valves that control the timing of charge air and/or fuel flow from a crossover passage into an expansion cylinder of a split-cycle engine.

These and other features and advantages of the invention will be more fully understood from the following detailed description of the invention taken together with the accompanying drawings.

DETAILED DESCRIPTION OF THE INVENTION

Figure 1:
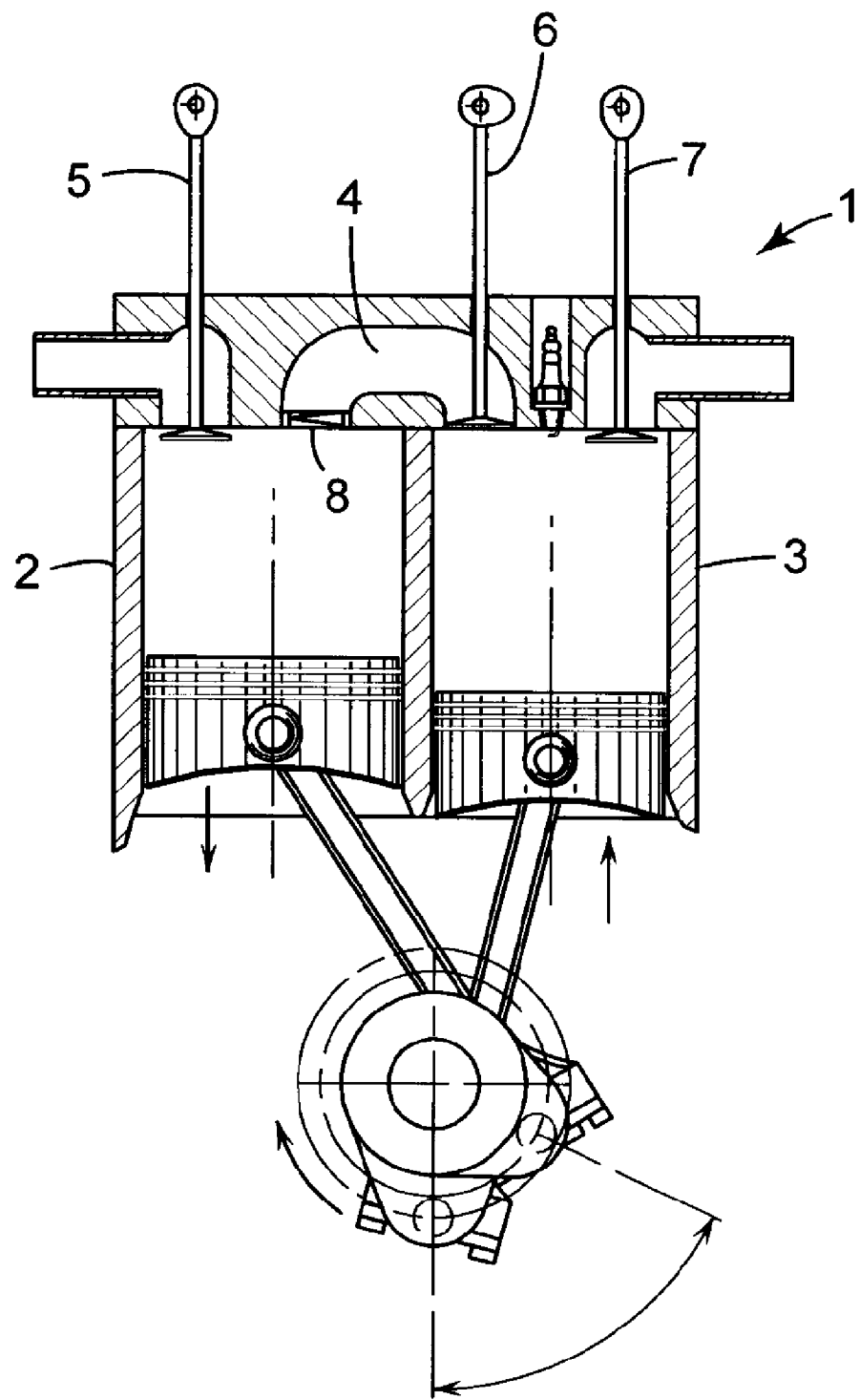
FIG. 1 is a schematic cross-sectional view of a prior art split-cycle engine.
Figure 2:
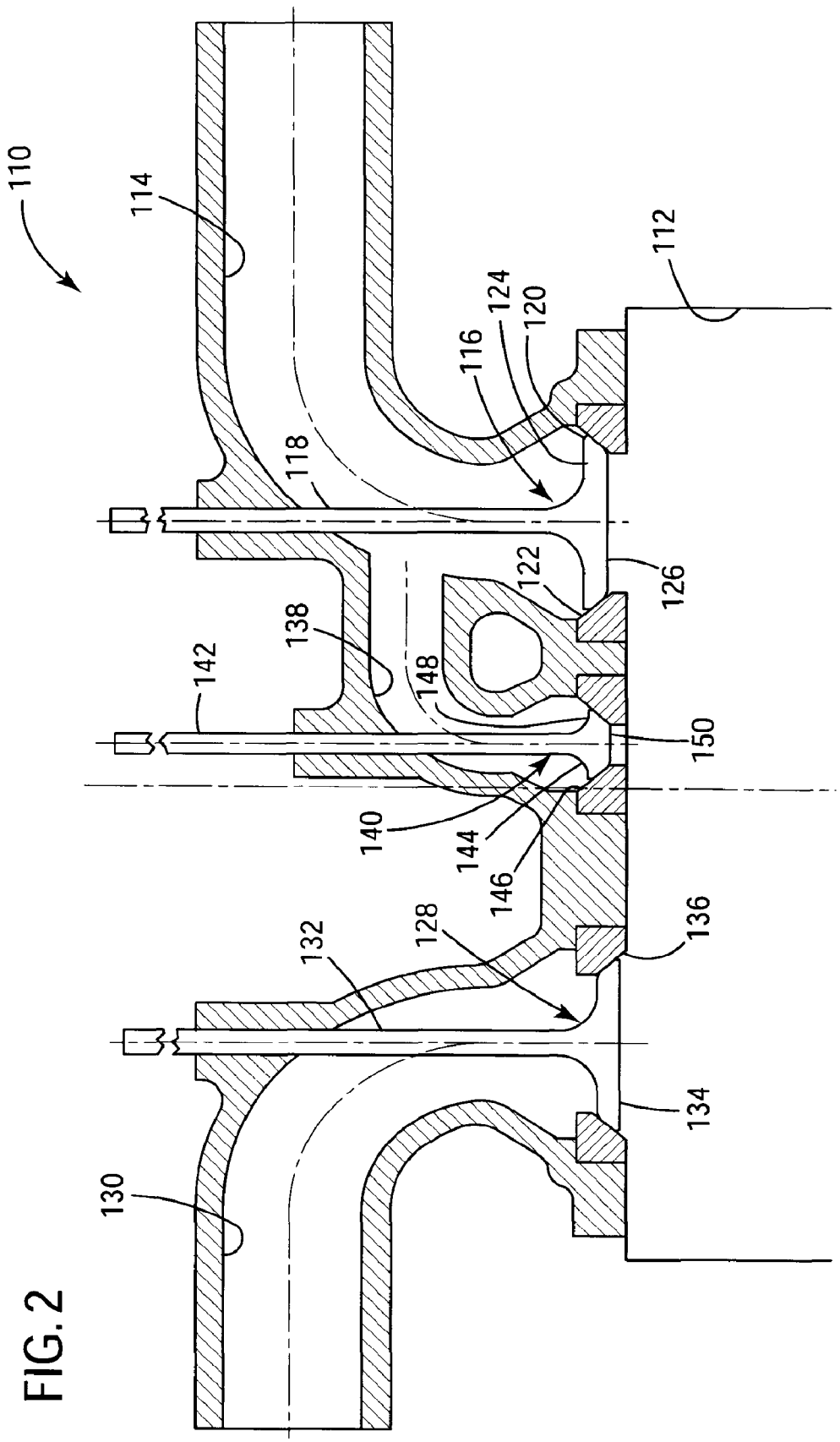
FIG. 2 is a schematic cross-sectional view of a first exemplary embodiment of the invention including a poppet-type pilot crossover valve.

Referring first to FIG. 2, numeral 110 generally indicates a first embodiment of a pertinent portion of a split-cycle engine of a type shown, for example, in the U.S. Pat. No. 6,542,225 previously noted. The exemplary engine 110 is shown schematically and not limited thereby as to general construction. Like reference numerals indicate like or similar components throughout the various embodiments.

As shown in FIG. 2, the split-cycle engine 110 includes an expansion (combustion/power) cylinder 112 which together with an expansion piston (not shown) define a variable volume combustion chamber. A crossover passage 114 interconnects the expansion cylinder 112 and a compression cylinder (not shown) of the split-cycle engine. The crossover passage 114 stores and carries pressurized air from the compressor cylinder for delivery to the expansion cylinder 112. The crossover passage 114 may be kept at a variable but elevated pressure.

A crossover expansion (XovrE) valve 116 controls flow of fluid from the crossover passage 114 into the expansion cylinder 112. The XovrE valve 116 is an outwardly opening poppet valve and may generally include a stem 118 terminating in a disc shaped poppet head 120 for engagement with an outwardly angled valve seat 122. The poppet head 120 is reciprocable within the crossover passage 114 and controls access to the expansion cylinder 112, cutting off air and/or fuel flow to the expansion cylinder when the poppet head 120 is seated on the valve seat 122. The poppet valve head 120 has an upper surface (face) 124 and a lower surface (face) 126. The upper surface 124 may also be referred to as an inner surface because it faces into the crossover passage 114, while the lower surface 126 may also be referred to as an outer surface because it faces away from and is disposed outside of the crossover passage 114. The XovrE valve 116 is actuated by any suitable actuating mechanism such as mechanical, electrical, hydraulic pneumatic or combination thereof, as desired.

An exhaust valve 128 controls flow of fluid (e.g., exhaust gases) from the expansion cylinder 112 into an exhaust passage 130. The exhaust valve 128 is an inwardly opening poppet valve and may generally include a stem 132 terminating in a disc shaped poppet head 134 for engagement with an inwardly angled valve seat 136. The poppet head 134 is reciprocable within the exhaust passage 130 and cuts off fluid flow to the exhaust passage when the poppet head 134 is seated on the valve seat 136. The exhaust valve 128 is actuated by any suitable actuating mechanism such as mechanical, electrical, hydraulic pneumatic or combination thereof, as desired.

An auxiliary passage 138 communicates the crossover passage 114 with the expansion cylinder 112. A pilot crossover valve 140 controls flow of fluid from the auxiliary passage 138 into the expansion cylinder 112. The pilot crossover valve 140 is actuated by any suitable actuating mechanism such as mechanical, electrical, hydraulic pneumatic or combination thereof, as desired. The pilot crossover valve 140 is an outwardly opening poppet valve and generally includes a stem 142 terminating in a disc shaped poppet head 144 for engagement with an outwardly angled valve seat 146. The poppet head 144 has an upper surface (face) 148 and a lower surface (face) 150. The poppet head 144 of the pilot crossover valve 140 has a smaller diameter than the poppet head 120 of the XovrE valve 116, and therefore has significantly less face surface area than the XovrE valve 116. More specifically, the upper face 148 of the pilot crossover valve 140 has less surface area than the upper face 124 of the XovrE valve 116.

In operation of the split-cycle engine 110, during an exhaust stroke of the expansion piston, the exhaust valve 128 is opened and upward movement of the expansion piston pushes exhaust gases out of the expansion cylinder 112 and into the exhaust passage 130. Since the exhaust passage 130 is open to atmosphere, the pressure in the expansion cylinder during the exhaust stroke is near atmospheric pressure. At the same time, the pressure in the crossover passage 114, which holds compressed air, is much greater than atmospheric pressure and may be as high as 90 to 100 bar. Therefore, a significant pressure differential exists across the XovrE valve 116 between the crossover passage 114 and the expansion cylinder 112. The pressure in the crossover passage 114 acts against the upper face 124 of the XovrE valve 116 and biases the poppet head 120 in a closed position against the valve seat 122.

As the expansion piston approaches top dead center ("TDC") in the exhaust stroke, the XovrE valve 116 is opened a few crank angle degrees before TDC. In order to open, the XovrE valve 116 would have to overcome the pressure in the crossover passage 114 ("cracking pressure") in order to lift away from and disengage the valve seat 122 (i.e., crack open). However, the pilot crossover valve 140 is opened a few degrees (for example, approximately five degrees) before the XovrE valve 116. Because the upper face 148 of the poppet head 144 of the pilot crossover valve 140 has a relatively small surface area, considerably less force is exerted on the upper face 148 of the pilot crossover valve 140 in comparison to the XovrE valve 116, the force being proportional to the surface area. Therefore, it is relatively easy to open the pilot crossover valve 140 against the pressure of the crossover passage 114 which is communicated to the auxiliary passage 138. When the pilot crossover valve 140 is opened, fluid flows from the crossover passage 114 into the expansion cylinder 112 via the auxiliary passage 138, thereby reducing the pressure differential across the XovrE valve 116 and facilitating the cracking open of the XovrE valve. Due to the small piston to cylinder head clearance of the split-cycle engine 110 at TDC, the volume of the combustion chamber at TDC is small. Therefore, when the pilot crossover valve 140 opens, the compressed air passing into the expansion cylinder 112 through the auxiliary passage 138 only has a small volume in which to fill. Thus, upon opening of the pilot crossover valve 140, the pressure in the expansion cylinder 112 drastically changes from atmospheric pressure towards the pressure of the crossover passage, resulting in a rapid equalization of pressure between the expansion cylinder and the crossover passage.

Figure 3:
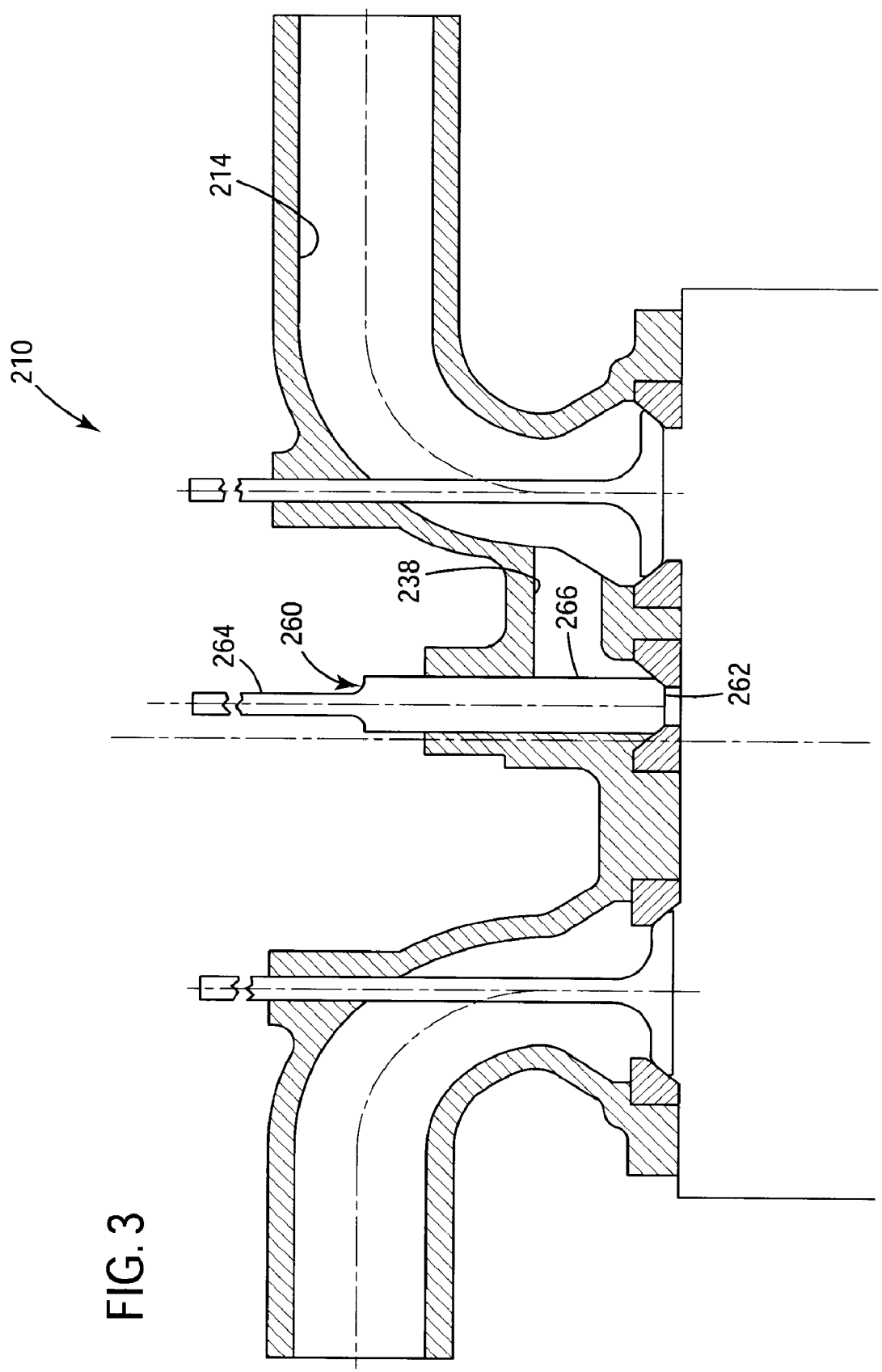
FIG. 3 is a schematic cross-sectional view of a second exemplary embodiment of the invention including a pintle-type pilot crossover valve.

Turning to FIG. 3, in a second embodiment the split-cycle engine 210 includes a pilot crossover valve 260 including a pintle 262 and a stem 264 extending from the pintle. Only the radial side surface 266 of the pintle 262 is exposed to the auxiliary passage 238 when the pilot crossover valve 260 is closed. Therefore, the high pressure in the crossover passage 214, and consequently in the auxiliary passage 238, has minimal effect on the opening of the pilot crossover valve 260.

Figure 4:
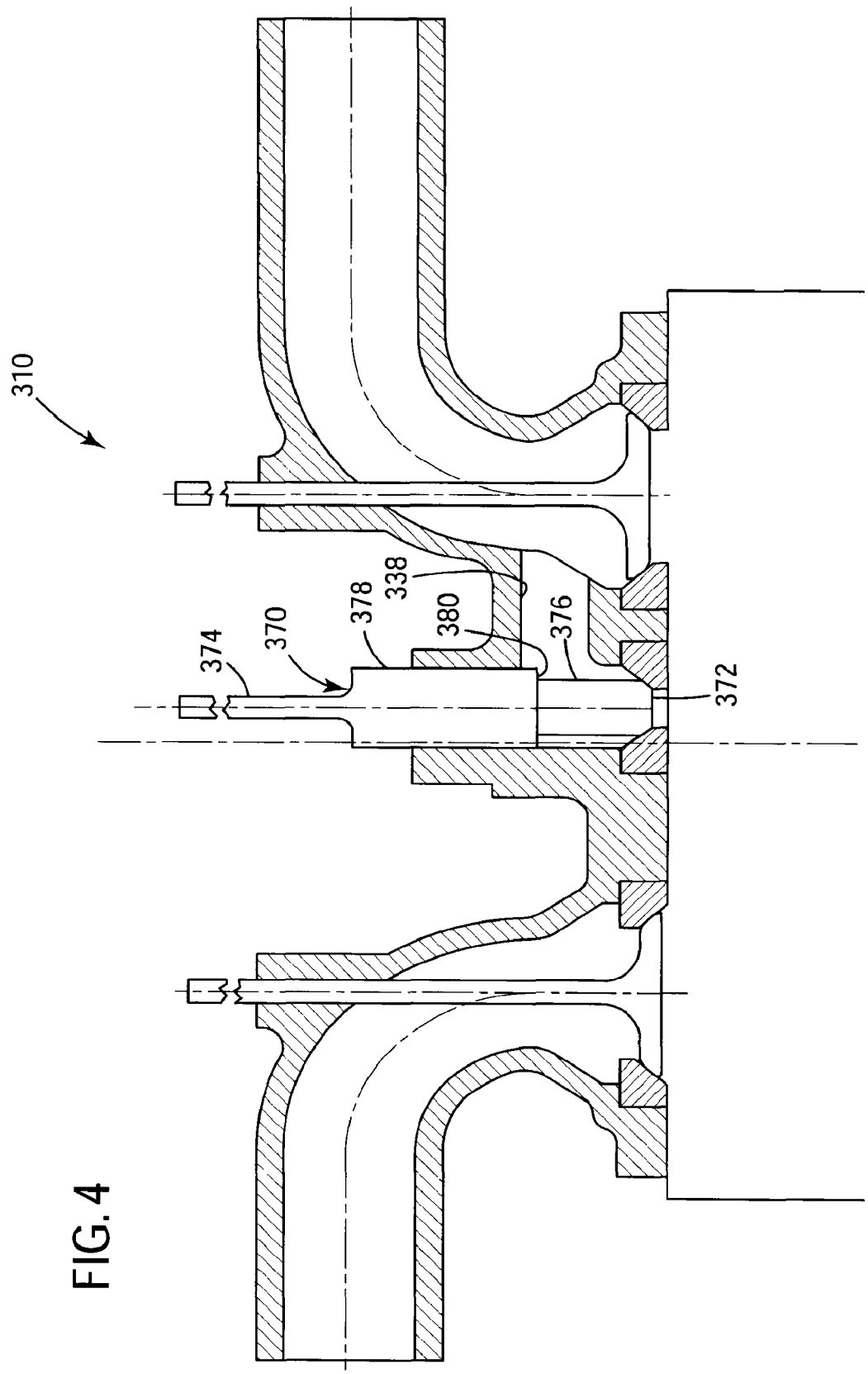
FIG. 4 is a schematic cross-sectional view of a third exemplary embodiment of the invention including a biased pintle-type pilot crossover valve.

Turning to FIG. 4, in a third embodiment the split-cycle engine 310 includes a pilot crossover valve 370 that is a biased pintle-type valve. The pilot crossover valve 370 includes a pintle 372 and a stem 374 extending from the pintle. The pintle 372 has a radial side surface 376 having an increased diameter portion 378 defining a step 380. The step 380 is disposed in the auxiliary passage 338. Pressure in the auxiliary passage acting on the surface area of the step pushes upward on the pintle 372 and biases the pilot crossover valve 370 in an open direction. Thus, the pressure in the auxiliary passage 338 assists in the opening of the pilot crossover valve 370.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A split-cycle engine comprising:
   a crankshaft rotatable about a crankshaft axis;
   a compression piston slidably received within a compression cylinder and operatively connected to the crankshaft such that the compression piston reciprocates through an intake stroke and a compression stroke during a single rotation of the crankshaft;
   an expansion piston slidably received within an expansion cylinder and operatively connected to the crankshaft such that the expansion piston reciprocates through an expansion stroke and an exhaust stroke during a single rotation of the crankshaft;
   a crossover passage interconnecting the expansion and compression cylinders, the crossover passage including a crossover compression (XovrC) valve and a crossover expansion (XovrE) valve defining a pressure chamber therebetween; and
   a pilot crossover valve disposed between the crossover passage and the expansion cylinder;
   wherein the pilot crossover valve equalizes fluid pressures acting against the crossover expansion (XovrE) valve in an opening direction, reducing the forces required in actuating the crossover expansion (XovrE) valve.

2. The split-cycle engine of claim 1, including an auxiliary passage communicating the crossover passage with the expansion cylinder, the pilot crossover valve controlling flow of fluid from the auxiliary passage into the expansion cylinder.

3. The split-cycle engine of claim 1, wherein the pilot crossover valve is a poppet-type valve.

4. The split-cycle engine of claim 1, wherein the pilot crossover valve is a pintle-type valve.

5. The split-cycle engine of claim 1, wherein the pilot crossover valve is a biased pintle-type valve.

6. The split-cycle engine of claim 1, wherein the pilot crossover valve is an outwardly opening valve that opens outwardly and away from the expansion cylinder.

7. The split-cycle engine of claim 1, wherein the crossover expansion (XovrE) valve is an outwardly opening poppet valve that opens outwardly into the crossover passage and away from the expansion cylinder.

8. A method of equalizing fluid pressure acting against a crossover valve of a split-cycle engine including a crankshaft rotatable about a crankshaft axis, a compression piston slidably received within a compression cylinder and operatively connected to the crankshaft such that the compression piston reciprocates through an intake stroke and a compression stroke during a single rotation of the crankshaft, an expansion piston slidably received within an expansion cylinder and operatively connected to the crankshaft such that the expansion piston reciprocates through an expansion stroke and an exhaust stroke during a single rotation of the crankshaft, and a crossover passage interconnecting the expansion and compression cylinders, the crossover passage including a crossover compression (XovrC) valve and a crossover expansion (XovrE) valve defining a pressure chamber therebetween, the method comprising the steps of:
   disposing a pilot crossover valve between the crossover passage and the expansion cylinder; and
   opening the pilot crossover valve prior to opening the crossover expansion (XovrE) valve during a single rotation of the crankshaft to equalize fluid pressures acting against the crossover expansion (XovrE) valve in an opening direction, reducing the forces required in actuating the crossover expansion (XovrE) valve.

9. The method of claim 8, including the step of forming an auxiliary passage that communicates the crossover passage with the expansion cylinder, wherein the pilot crossover valve controls flow of fluid from the auxiliary passage into the expansion cylinder.

10. The method of claim 8, wherein the pilot crossover valve is a poppet-type valve.

11. The method of claim 8, wherein the pilot crossover valve is a pintle-type valve.

12. The method of claim 8, wherein the pilot crossover valve is a biased pintle-type valve.

13. The method of claim 8, wherein the pilot crossover valve is an outwardly opening valve that opens outwardly and away from the expansion cylinder.

14. The method of claim 8, wherein the crossover expansion (XovrE) valve is an outwardly opening poppet valve that opens outwardly into the crossover passage and away from the expansion cylinder.

* * * * *